(12) United States Patent
Barlettano (10) Patent No.: US 10,712,029 B1
(45) Date of Patent: Jul. 14, 2020

(54) EVAPORATIVE PERSONAL AIR COOLER

(71) Applicant: ONTEL PRODUCTS CORPORATION, Fairfield, NJ (US)

(72) Inventor: Scott Barlettano, Wayne, NJ (US)

(73) Assignee: ONTEL PRODUCTS CORPORATION, Fairfield, NJ (US)

( * ) Notice: Subject to any disclaimer, the term of this patent is extended or adjusted under 35 U.S.C. 154(b) by 0 days.

(21) Appl. No.: 16/239,161

(22) Filed: Jan. 3, 2019

(51) Int. Cl.
*F24F 6/04* (2006.01)
*F24F 5/00* (2006.01)
*F24F 6/14* (2006.01)

(52) U.S. Cl.
CPC .............. *F24F 5/0035* (2013.01); *F24F 6/04* (2013.01); *F24F 6/14* (2013.01)

(58) Field of Classification Search
CPC .............. F24F 6/04; F24F 6/14; F24F 5/0035
See application file for complete search history.

(56) References Cited

U.S. PATENT DOCUMENTS

| | | |
|---|---|---|
| D185,748 S | 7/1959 | Goettl |
| 4,016,835 A | 4/1977 | Yarden |
| D279,815 S | 7/1985 | Yuen |
| D291,350 S | 8/1987 | Sherman |
| 4,835,982 A | 6/1989 | Ferdows |
| 5,309,726 A * | 5/1994 | Asbridge ............. F24F 5/0035 62/91 |
| D361,828 S | 8/1995 | Chen |
| D367,525 S | 2/1996 | Gruebel |
| D414,253 S | 9/1999 | Kobayashi |
| 6,098,895 A | 8/2000 | Walzel |
| D433,111 S | 10/2000 | Wright |
| 6,293,121 B1 | 9/2001 | Labrador |

(Continued)

FOREIGN PATENT DOCUMENTS

| | | |
|---|---|---|
| CN | 106091220 A | 11/2016 |
| CN | 107327992 A | 11/2017 |

(Continued)

OTHER PUBLICATIONS

GDSTIME EC Cooling Fan, www.amazon.com/dp/B07H8W376G, retrieved Nov. 7, 2018.

(Continued)

*Primary Examiner* — Edward F Landrum
*Assistant Examiner* — Alexis K Cox
(74) *Attorney, Agent, or Firm* — Dickinson Wright, PLLC (57) ABSTRACT

An evaporative air cooler for cooling ambient air includes a housing, a tank, a misting structure, a filter structure, and a fan. The housing includes a top panel, a bottom panel, and side panels defining an interior of the evaporative air cooler. The tank is positioned adjacent to the top panel and at least one of the side panels. The tank receives, stores, and releases liquid. The misting structure comprises a mister and a misting structure coupling and creates a mist within the evaporative air cooler. The filter structure has a plurality of filters for absorbing the mist. The fan draws the ambient air into the evaporative air cooler and directs the ambient air through the filter structure and out of the evaporative air cooler. The evaporative air cooler cools the ambient air by at least one of the mist and the filter structure before exiting the evaporative air cooler.

20 Claims, 10 Drawing Sheets

(56) References Cited

U.S. PATENT DOCUMENTS

| | | | |
|---|---|---|---|
| 6,581,402 | B2 | 6/2003 | Maisotsenko |
| D543,614 | S | 5/2007 | Chen |
| D553,725 | S | 10/2007 | Shimizu |
| D559,973 | S | 1/2008 | Rabito |
| D594,960 | S | 6/2009 | Orihara |
| D606,645 | S | 12/2009 | Orihara |
| 7,698,906 | B2 | 4/2010 | Jarvis |
| D616,080 | S | 5/2010 | Ching |
| 7,997,565 | B1 | 8/2011 | Chan |
| D733,273 | S | 6/2015 | Jeon |
| D733,860 | S | 7/2015 | Konno |
| D804,001 | S | 11/2017 | Cartwright |
| 10,006,648 | B2 | 6/2018 | Vandermeulen |
| D827,115 | S | 8/2018 | Petersen |
| 2009/0211291 | A1 | 8/2009 | Gildersleeve |
| 2019/0226696 | A1* | 7/2019 | Kim .......................... F24F 3/16 |

FOREIGN PATENT DOCUMENTS

| | | |
|---|---|---|
| CN | 108826551 A | 11/2018 |
| EP | 001712704-0001 | 6/2010 |
| JP | 1374275 | 11/2009 |
| JP | 1388881 | 5/2010 |
| KR | 30-0764177 | 10/2014 |
| KR | 30-0865259 | 7/2016 |
| WO | 9513506 A1 | 5/1995 |

OTHER PUBLICATIONS

ONTEL AA-MC4 Arctic Air Personal Space & Portable Cooler | The Quick & Easy Way to Cool Any Space, As Seen on TV, www.amazon.com/AA-MC4-Arctic-Personal-Portable-Cooler/dp/B0787DD3RX, retrieved Oct. 31, 2018.

Evapolar Air Cooler evaSMART EV-3000 Opaque White US Plug, www.amazon.com/dp/B075G1HBNW, retrieved Oct. 31, 2018.

Evapolar EV1000CART Replacement Evaporative Cartridge for EV-1000 evaLIGHT Personal Air Cooler and Humidifier, www.amazon.com/Evapolar-EV1000CART-Replacement-Evaporative-Humidifier/dp/B06XT5B742, retrieved Oct. 31, 2018.

HoMedics MyChill Personal Space Cooler in Blue, www.amazon.com/HoMedics-MyChill-Personal-Space-Cooler/dp/B075564HQZ, retrieved Oct. 31, 2018.

Filter for Personal Space Cooler, Arctic Air Cooler Replacement Filter Humidifier, www.amazon.com/dp/B07DGWMSH6/, retrieved Oct. 31, 2018.

Ontel Arctic Air Personal Space Cooler Replacement Filter Authentic OEM, www.amazon.com/dp/B07DQ6DXXC/, retrieved Oct. 31, 2018.

World's First Personal Air Cooler (EVAPOLAR), www.youtube.com/watch?v=k4NxBWPTqOA, published Aug. 23, 2016.

European Search Report; Appl. No. 19154738.9; dated Aug. 29, 2019; 4 pages.

Global Sources Home Products, No. 10, vol. 8, p. 11, Design Devision of the Japan Patent Office; Nov. 27, 2014.

Domus, vol. 767, Jan. 31, 1995, p. 108, Design Division of the Japan Patent Office.

Issuance of Notice of Grant for Japanese Design Application No. 2018-013816.

* cited by examiner

EVAPORATIVE PERSONAL AIR COOLER

FIELD OF THE INVENTION

The present disclosure relates generally to an evaporative personal air cooler.

BACKGROUND

Evaporative personal air coolers are commonly used to cool air in a home, office, or another hot, dry air environment. Conventional evaporative air coolers operate by drawing air into the evaporative air cooler and through a water-soaked filter device. The air releases heat to evaporate water trapped in the water-soaked filter device. The evaporated water cools the air as it leaves the water-soaked filter device and exits the evaporative air cooler.

Conventional evaporative air coolers typically include a fan, a filter device, and a water distribution system. The fan draws outside air into the evaporative air cooler, pushes it through the evaporative air cooler to produce cooler air, and then pushes the cooler air out of the evaporative air cooler. More specifically, the water distribution system provides water to the filter device so that the filter device becomes water soaked. The water distribution system includes a water pump that draws water from a reservoir and distributes the water to a bottom surface of the filter device to soak upwards. Depending on the type of filter and the amount of water in the reservoir, the water may travel only partially up the filters. If the filters are not fully soaked with water, the evaporative air cooler is less effective at producing cooler air. The filter device includes filters typically made of a paper-like material that have to be replaced often. The filters 58 cannot be reused or easily cleaned.

Some of the water distributed to the filter device evaporates as air flows through the filters. The water in the reservoir depletes as the evaporative air cooler operates due to the evaporation. Any unabsorbed water that recirculates within the evaporative air cooler returns to the reservoir. When the reservoir fully depletes of water but the filter device is soaked with water, the evaporative air cooler can still produce cooler air, but it becomes less effective. The evaporative air cooler will cease producing cooler air when the filter device is dry. Thus, additional water must be constantly added to replace the water that has been evaporated.

Furthermore, it typically takes conventional evaporative air coolers a time to begin cooling air because the filter device must soak up water from the reservoir before the cooling process can begin. In other words, conventional evaporative air coolers do not instantly produce cooler air.

SUMMARY

This section provides a general summary of the present disclosure and is not a comprehensive disclosure of its full scope or all of its features, aspects, and objectives.

Disclosed herein are implementations of an evaporative air cooler. The evaporative air cooler includes a water tank, a misting structure, a filter structure, and a fan. The water tank includes a liquid inlet and a liquid outlet, wherein liquid enters the water tank through the liquid inlet and exits the water tank through a liquid outlet. The misting structure can be in liquid communication with the water tank and configured to create a mist as the liquid flows through the liquid outlet. The filter structure has a plurality of filters positioned substantially parallel to each other and defining air gaps between the plurality of filters. The fan is configured to draw ambient air into the evaporative air cooler and direct the ambient air through the filter structure and out of the evaporative air cooler, wherein the ambient air is cooled before exiting the evaporative air cooler.

Also disclosed herein are implementations of a portable evaporative air cooler for cooling ambient air. The portable evaporative air cooler includes a misting structure, a filter structure, and a fan. The misting structure is configured to evaporate a liquid to form a mist within the portable evaporative air cooler. The filter structure includes with a plurality of filters configured to absorb the mist. The fan is configured to draw the ambient air into the portable evaporative air cooler, wherein the ambient air is cooled by at least one of the mist and the filter structure, and wherein the fan directs the ambient air thorough the filter structure and out of the portable evaporative air cooler.

Also disclosed herein is a personal air cooler comprising a housing, a tank, a misting structure, a filter structure, and a v-shaped shroud. The housing includes a top panel, a bottom panel, and side panels defining an interior of the personal air cooler. The tank is positioned adjacent the top panel and at least one of the side panels and configured to receive, store, and release liquid. The misting structure can be in fluid communication with the tank and configured to create a mist. The filter structure is adjacent the bottom panel and at least one of the side panels. The v-shaped shroud is positioned underneath the tank and configured to direct the mist toward the filter structure.

BRIEF DESCRIPTION OF THE DRAWINGS

The disclosure is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

The following description is merely exemplary in nature and is not intended to limit the disclosure in its application or uses. For purposes of clarity, the same reference numbers are used in the description and drawings to identify similar elements.

The present disclosure relates generally to an evaporative personal air cooler by which it draws in ambient air, cools the ambient air, and blows out the cooled ambient air. In this disclosure, the evaporative personal air cooler may be referred to as an evaporative air cooler, a portable evaporative air cooler, or any other desirable air cooler.

The evaporative air cooler 10 can include a housing 20 having a power adapter, a water tank 40, a v-shaped shroud 44, a fan 48, a drawer 50, and a filter structure 56.

Figure 1:
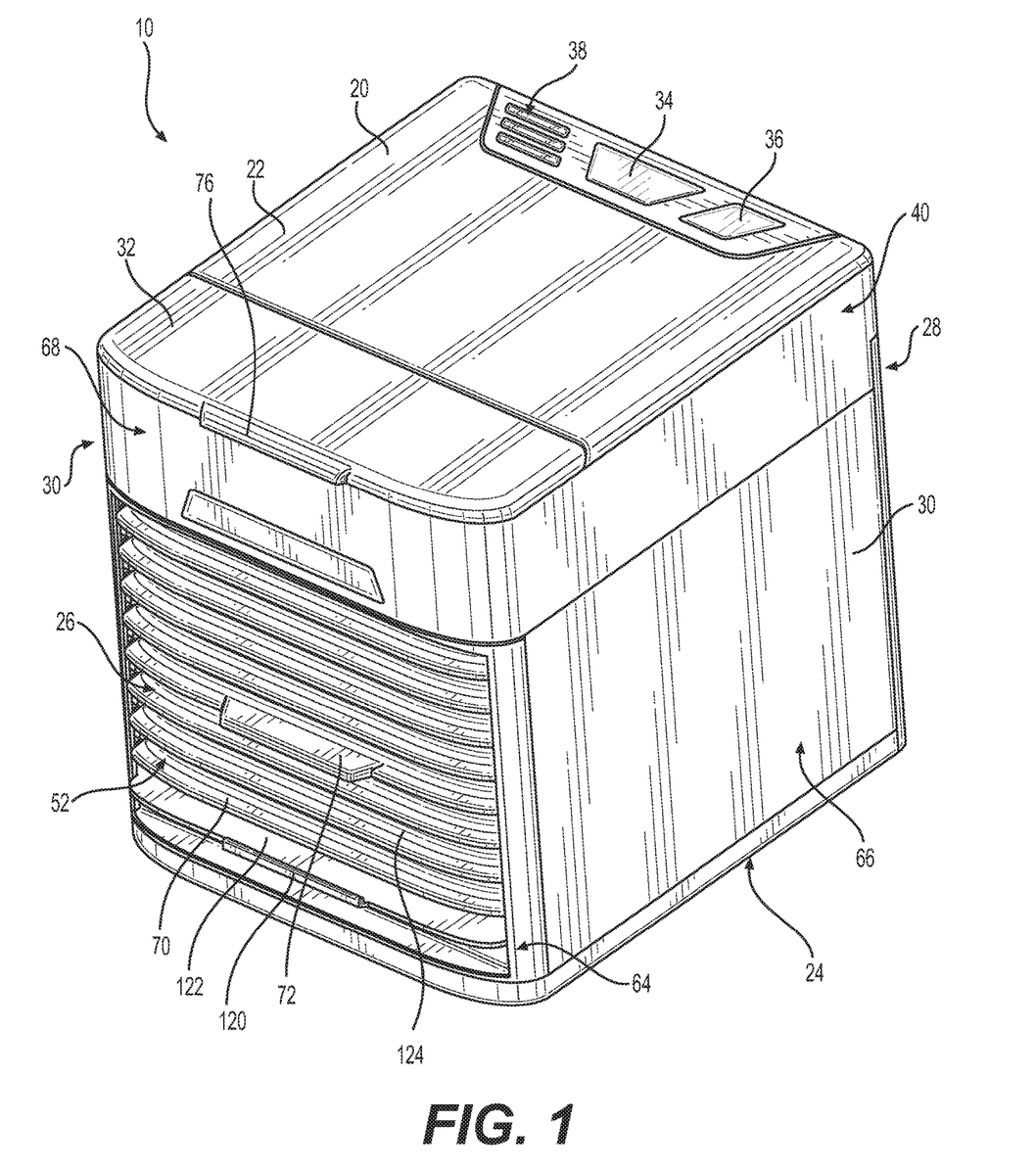
FIG. 1 is a perspective view of an evaporative personal air cooler in accordance with aspects of the present disclosure.

FIG. 1 illustrates an exemplary evaporative air cooler 10. The evaporative air cooler can include the housing 20 with a top face 22, a bottom face 24, and four lateral faces, such as a front face 26, a back face 28, and side faces 30. The housing 20 can be formed as a cube housing, a rectangular housing, or any other desirable configuration or shape. The housing 20 can be formed of plastic or any other desirable material.

Figure 2:
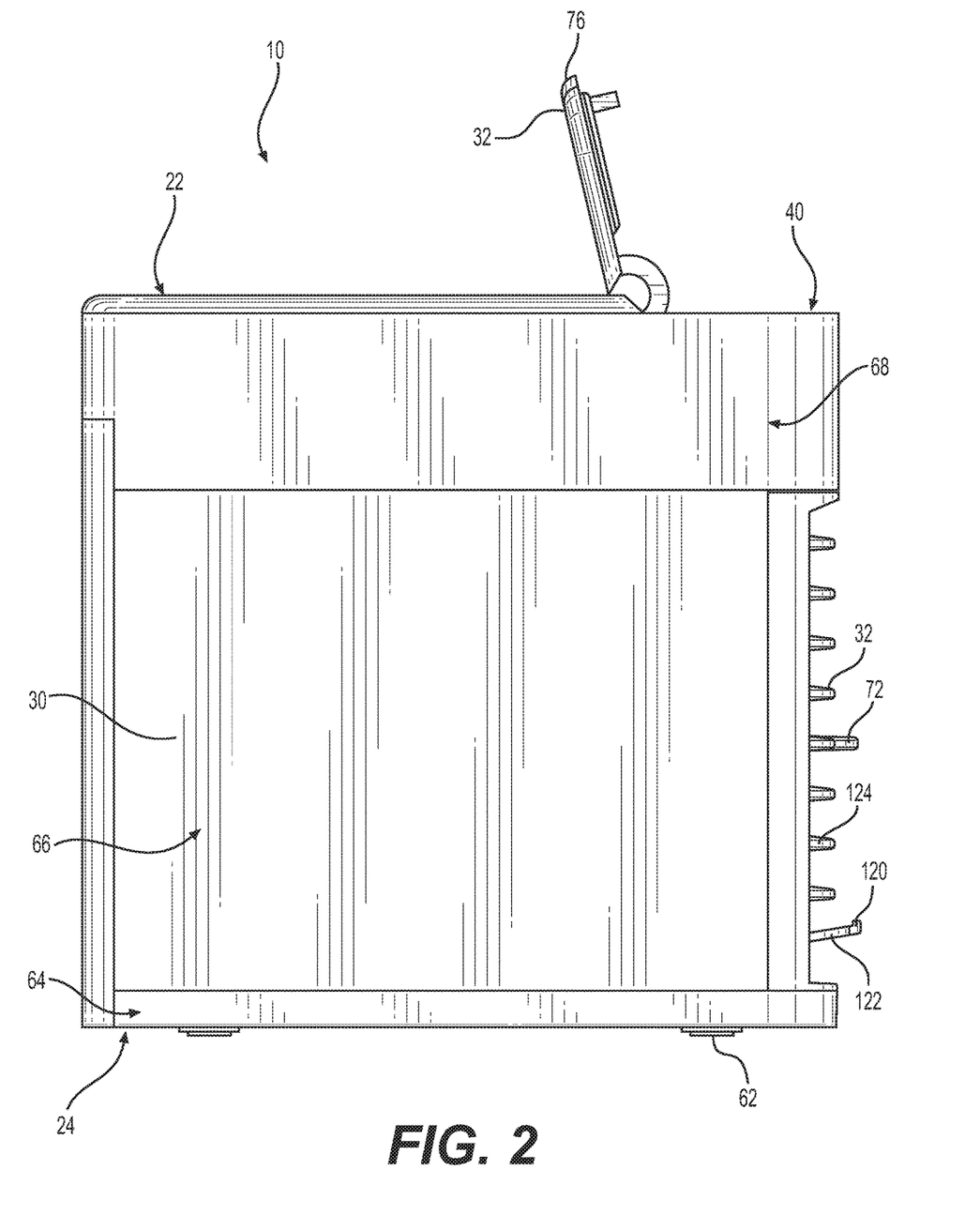
FIG. 2 is a side view of an evaporative personal air cooler in accordance with aspects of the present disclosure.

The top face 22 can include a lid, such as a hinged lid 32. FIG. 2 illustrates the evaporative air cooler 10 with the hinged lid 32 opened for access to the water tank 40. The hinged lid 32 can be located along a front portion of the top face 22. The hinged lid 32 can include a lid tab 76 positioned in the front of the hinged lid 32 or any other desirable location. The hinged lid 32 can be opened to allow for water to fill the water tank 40. For example, a user can pull the lid tab 76 upward to open the hinged lid 32. The hinged lid 32 can be formed of plastic or any other desirable material. The opening to the water tank 40 can be any desirable opening and is not limited to the hinged lid 32 described in this disclosure.

The top face 22 can also include buttons, such as a power button 34, a light button 36, or any other desirable button. The top face 22 can also include one or more lights, such as an indicator light 38 or any other desirable light or indicator. The indicator light 38 may be used to indicate a fan speed, a level of water located within the water tank 40, whether filters 58 should be replaced, or any other desirable indication. For example, at a high speed, all three indicator lights 38 can be powered ON. At a medium speed, two indicator lights 38 can be powered ON. At a low speed, one indicator light 38 can be powered ON. In one embodiment, if the power button 34 is held down for at least three seconds, the indicator lights 38 can all turn off. The indicator light 38 may include one or more lights. The indicator light 38 may display a blinking light or a solid light. The indicator light 38 may display different light colors, such as green, red, amber, or any other desirable color.

The power button 34 can be configured to activate (e.g., power ON), change the fan speed of the fan 48, and deactivate (e.g., power OFF) the evaporative air cooler 10. For example, when the power button 34 is first activated, the indicator light 38 (e.g., three indicator lights 38) can turn ON, the fan 48 can turn ON (e.g., to a high speed), and an aperture 42 positioned in the water tank 40 can allow water to flow out of the tank 40 to begin the evaporative air cooling process. When the power button 34 is activated a second time, one of the indicators light 38 can turn OFF (e.g., two indicator lights 38 remain ON), the fan speed can decrease (e.g., to a medium speed), and the aperture 42 can allow less water to flow out of the tank 40. When the power button 34 is activated a third time, one of the indicators light 38 can turn OFF (e.g., one indicator light 38 remain ON), the fan speed can decrease (e.g., to a low speed), and the aperture 42 can allow less water to flow out of the tank 40. When the power button 34 is activated a fourth time, one of the indicators light 38 can turn OFF (e.g., no indicator lights 38 remain ON), the fan 48 can turn OFF, and the aperture 42 can stop the water from flowing out of the tank 40. In other words, the power button 34 can be activated to deactivate, or power OFF the evaporative air cooler 10. In one embodiment, when the power button 34 is activated (e.g. pressed downward) for three or more seconds, it can turn OFF the indicator lights 38 and the evaporative air cooler 10.

The fan 48 can be wired to the evaporative air cooler 10. The wires can be soldered to electrically connect the fan 48 to the evaporative air cooler 10, or attached in any other desirable way. The wires can be hidden in a wire compartment or any other desirable compartment within the evaporative air cooler 10.

A light, such as a blue LED light, can be positioned within the water tank 40, such as beneath the power button 34, or any other desirable area for illuminating the water tank 40. The light can be used for ambiance, as a nightlight, or any other desirable purpose. The light may be on by default when the evaporative air cooler 10 is powered ON. The user can lower the brightness of the light or turn OFF the blue LED completely by pressing the light button 36. For example, after the power button 34 is pressed, the light is on a high brightness mode. When the user presses the light button 36 for a first time, the light can reduce its brightness (e.g., to a low brightness mode). When the user presses the light button for a second time, the light can turn OFF. In one embodiment, if the light button 36 is activated for a minimum amount of time (e.g., three seconds), an illumination setting can be selected and/or locked.

As illustrated in FIG. 2, the bottom face 24 can include feet 62 that project outward from the bottom face 24. The feet 62 can be configured to elevate the evaporative air cooler 10 from a surface it is placed on. The feet 62 can also be configured to prevent the evaporative air cooler 10 from damaging the surface. For example, when sliding the evaporative air cooler 10 across the surface, the feet 62 can prevent the scratching of the surface. The feet 62 may be formed of rubber, plastic, grips, or any other desirable material. The bottom face 24 can include a plurality of feet 62. The feet 62 may be formed as circular feet 62, ovular feet 62, square feet 62, rectangular feet 62, or any other desirable shape. The feet 62 can be positioned toward each corner of the bottom face 24, or any other desirable location. In an alternative embodiment, the bottom face 24 does not include feet 62.

The lateral faces can include a front face 26, a back face 28, and two side faces 30. The lateral faces can be positioned between the top face 22 and the bottom face 24 about their outer perimeters. The lateral faces can be positioned adjacent each other. The lateral faces can include a framed portion 64 and a face portion 66. The framed portion 64 can be positioned about a perimeter of a lateral face, wherein the face portion 66 is positioned within the framed portion 64. For example, the side faces 30 can include an upper portion 68, the framed portion 64 positioned adjacent the upper portion 68 and along the side and bottom edges of the side faces 30, and a face portion 66 positioned within the framed portion 64.

Figure 3:
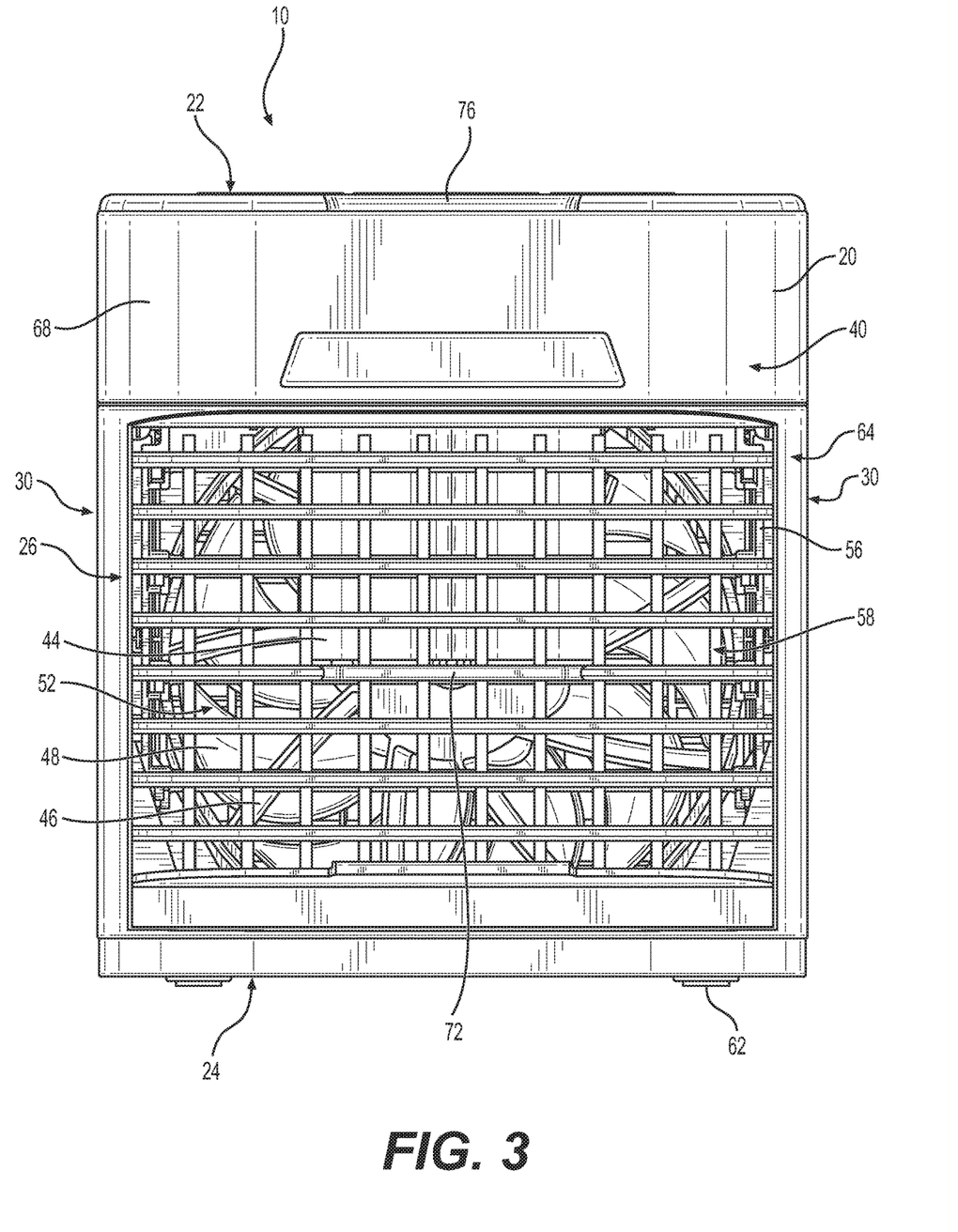
FIG. 3 is a front view of an evaporative personal air cooler in accordance with aspects of the present disclosure.

As illustrated in FIG. 3, the front face 26 can include an upper portion 68 and a framed portion 64 positioned adjacent the upper portion 68 and along the side and bottom edges of the top face 22. The front face 26 can also include an outlet vent 52 positioned within the framed portion 64. The outlet vent 52 can include a plurality of vents 70, an air direction tab 72, and a filter drawer tab 120. The plurality of vents 70 can include a fixed vent 122 and an adjustable vent 124. For example, the fixed vent 122 may be positioned as the lowest vent 70 on the outlet vent 52. The remainder of the plurality of vents 70 may consist of the adjustable vent 124. Each of the plurality of vents 70 can be positioned horizontally in the outlet vent 52. Each of the adjustable vents 124 can be movably connected to the air direction tab 72. The air direction tab 72 can be positioned to direct air flowing from inside the evaporative air cooler 10 through the outlet vent 52. For example, if the air direction tab 72 is positioned upward, the adjustable vents 124 may be positioned in an upward position to direct the airflow upward. Similarly, if the air direction tab 72 is positioned downward, the adjustable vents 124 may be positioned in a downward position to direct the airflow downward. If the air direction tab 72 is positioned in a center position, the adjustable vents 124 may be positioned in a substantially horizontal position, directing the air to flow horizontally from the evaporative air cooler 10. The air direction tab 72 can direct the air to flow at any angle between the downward and upward angles.

Figure 4:
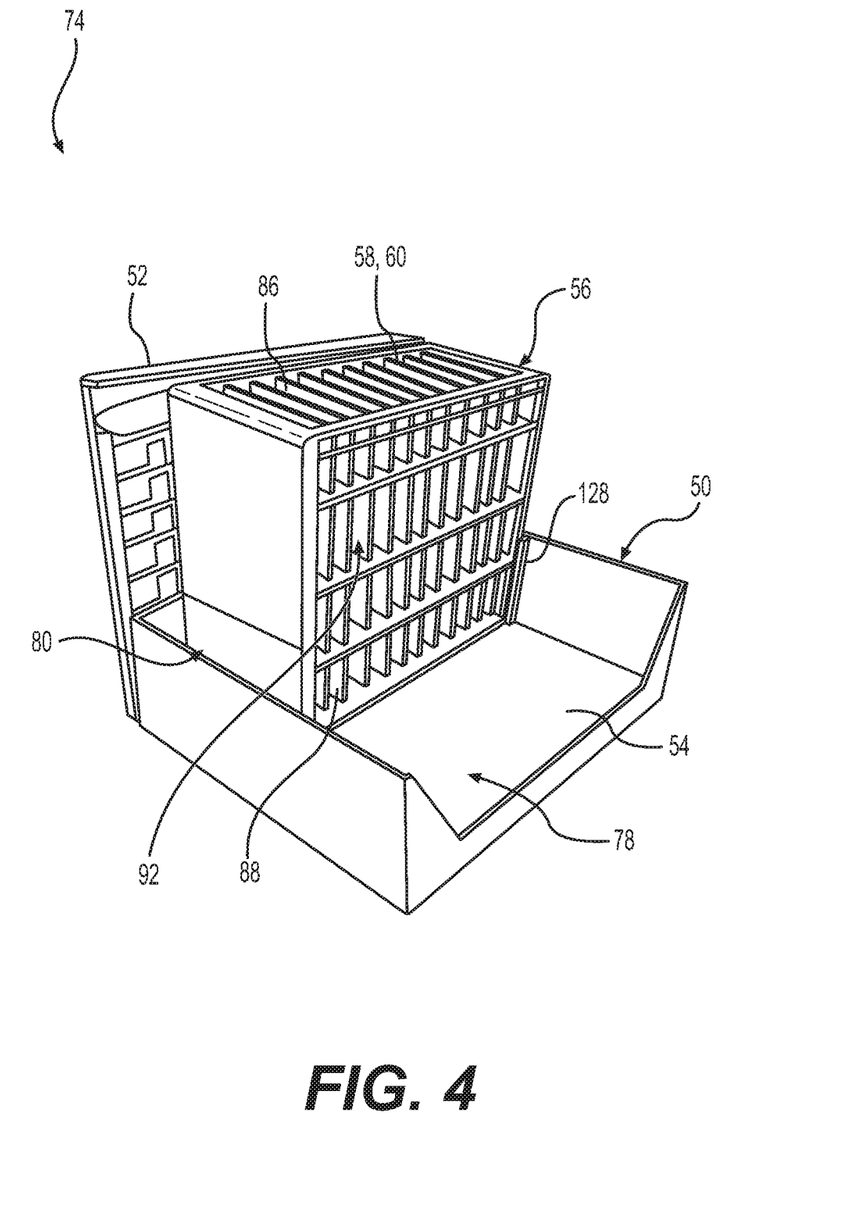
FIG. 4 is a perspective view of an internal assembly of an evaporative personal air cooler in accordance with aspects of the present disclosure.
Figure 5:
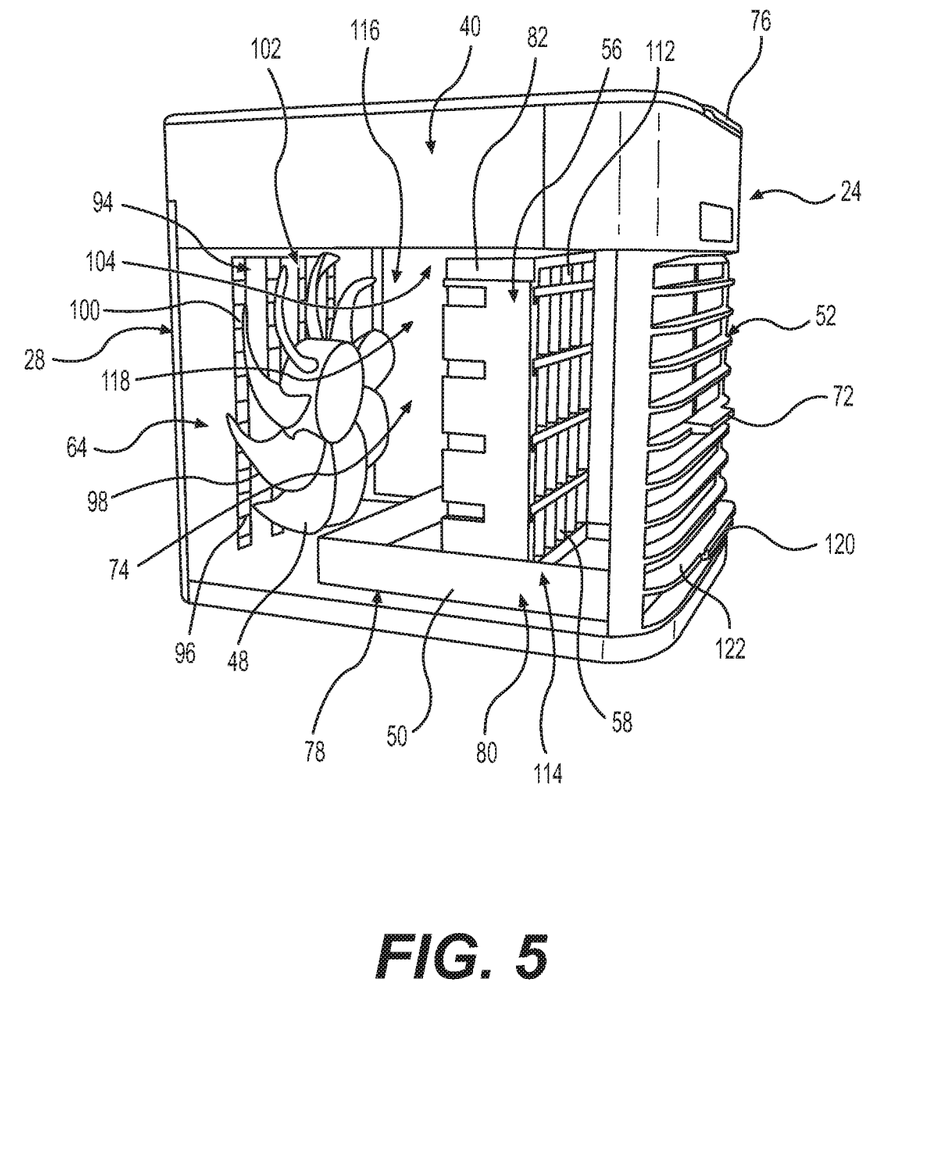
FIG. 5 is a perspective view of an interior of an evaporative personal air cooler in accordance with aspects of the present disclosure.

The face portion 66 of the front face 26, such as the outlet vent 52, can be connected to an internal assembly 74 that is removable from the housing 20. As illustrated in FIGS. 4 and 5, the internal assembly 74 of the evaporative air cooler 10 can include the filter structure 56 including filters 58, the drawer 50 including a water tray 54. The internal assembly 74 can fit tightly around the circumference of the fan 48. For example, the internal assembly 74 can form a seal around the fan 48 to direct air out of the evaporative air cooler 10. The internal assembly 74 can be configured to increase the force of the air as it exits the evaporative air cooler 10 to increase the cooling effect of the evaporative air cooler 10. The internal assembly 74 may also be configured to decrease noises produced during operation of the evaporative air cooler 10. For example, the seal, such as an airtight seal, reduces the amount of air escaping from the evaporative air cooler 10 and reduces air vibrating off of other components or the walls of the evaporative air cooler 10.

The drawer 50 can be attached to the outlet vent 52. The outlet vent 52 can be removed from the evaporative air cooler 10. For example, the fixed vent 122 can include a filter drawer tab 120. The user can pull on the filter drawer tab 120 to remove the outlet vent 52 from the evaporative air cooler 10. The outlet vent 52 can have one or more tabs or any other desirable device for removing the outlet vent 52 from the evaporative air cooler 10. An interior side of the side faces 30 can include a drawer guide 108. The drawer guide 108 is configured to assist the user in slidably removing and inserting the drawer from and into the housing 20.

The drawer 50 can include the water tray 54. The water tray 54 can be positioned in the drawer 50. The water tray 54 can be formed as the bottom of the housing 20. The water tray 54 can be angled for any liquid on the water tray 54 to flow in a direction toward the filter structure 56. For example, the water tray 54 can be higher toward a back end 78 of the drawer 50 than toward the front end 80 of the drawer. The water tray 54 can be configured for cleaning. For example, when the drawer 50 is removed from the evaporative air cooler 10 and the filter structure 56 is removed from the water tray 54, the water tray 54 can be easily accessible for cleaning. The user can wipe down and dry or otherwise clean the water tray 54. Cleaning the water tray 54 may result in less mold or other bacteria.

The drawer 50 can be configured to support the filter structure 56. The filter structure 56 can be removably attached to the drawer 50. The drawer 50 can have a drawer notch 128 to secure the filter structure 56 in place. For example, the filter structure 56 can be placed on a top surface of the water tray 54 between the outlet vent 52 and the drawer notch 128.

Figure 6A:
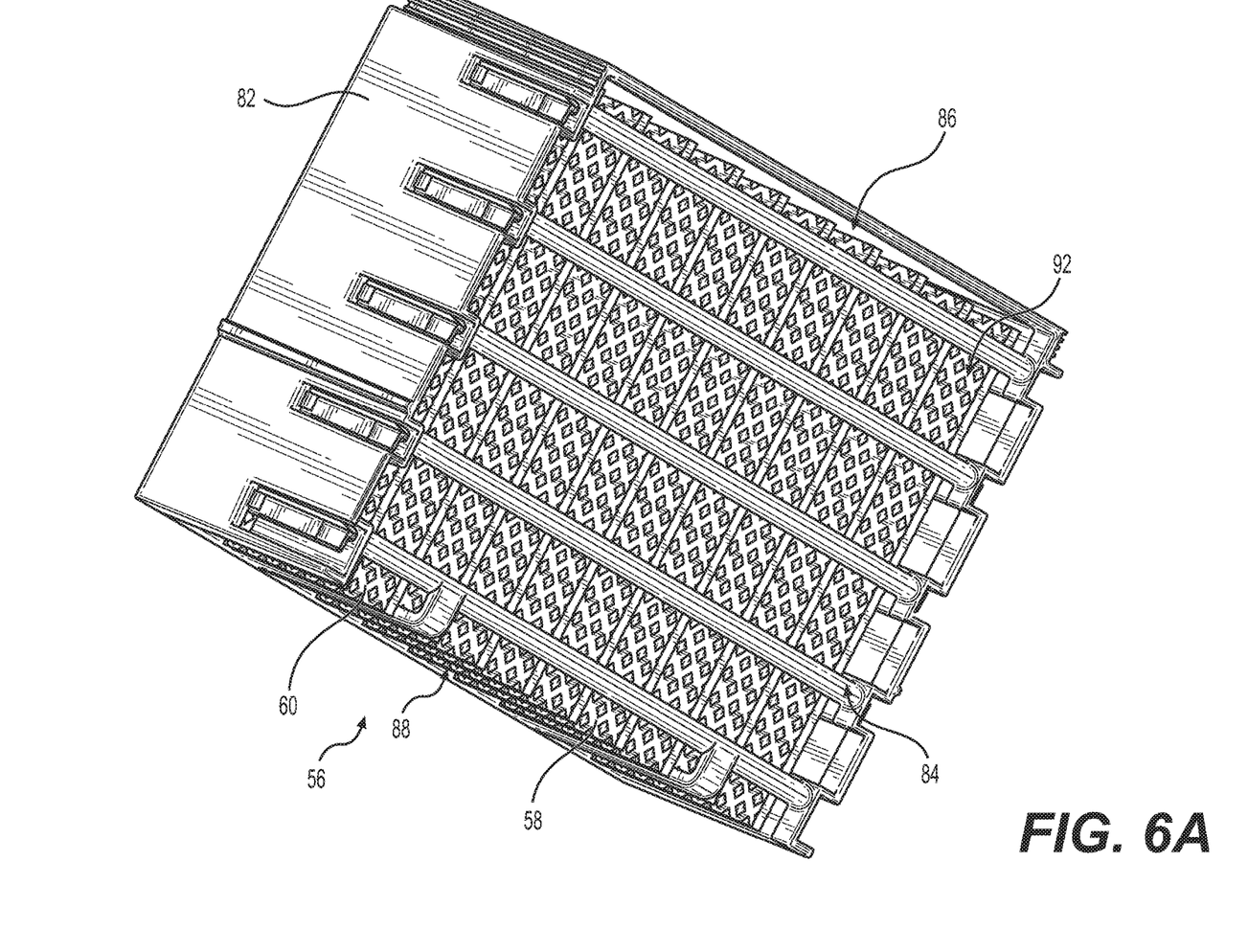
FIGS. 6A-6B are perspective views of a filter structure of an evaporative personal air cooler in accordance with aspects of the present disclosure.
Figure 6B:
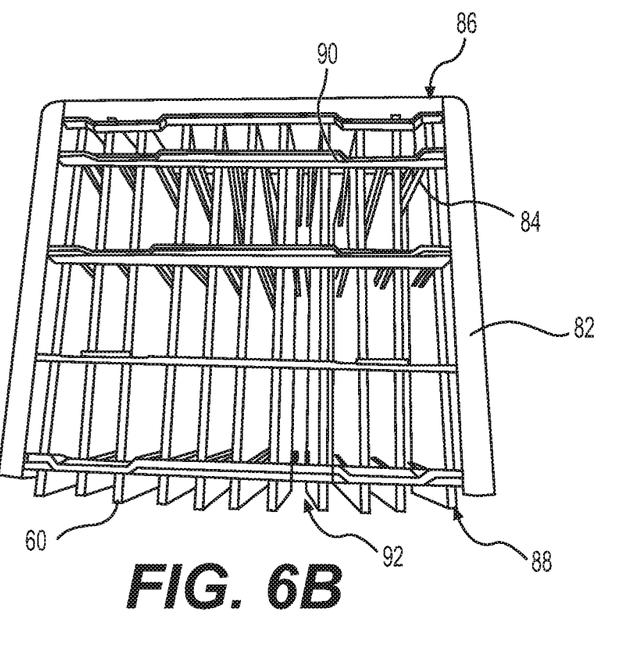
Figure 6C:
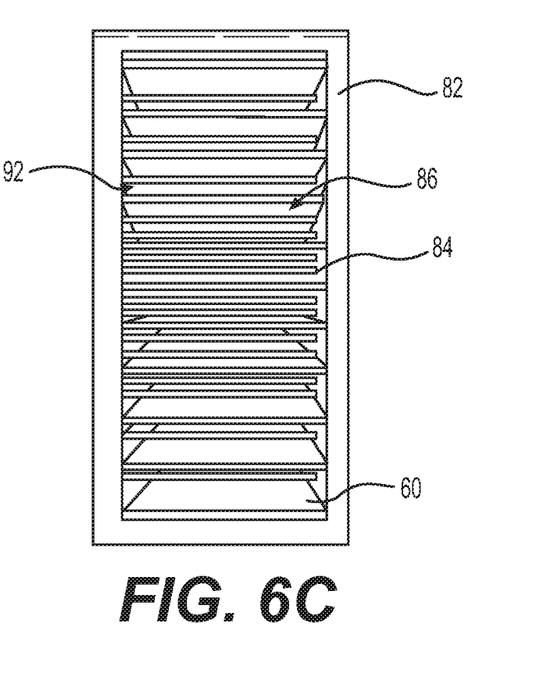
FIG. 6C is a top view of a filter structure of an evaporative personal air cooler in accordance with aspects of the present disclosure.

As illustrated in FIGS. 6A-6C, the filter structure 56 can include a filter frame 82 and a plurality of filter holders 84 attached to opposing sides of the filter frame 82. In one exemplary embodiment, as illustrated in FIG. 6C, the filter frame 82 can include a top opening 86 and a bottom opening 88. The top opening 86 can be configured to allow for a mist 118 to contact top portions 112 of the filters 58. The bottom opening 88 can be configured to allow for the mist 118 and/or liquid, such as water, to contact bottom portions 114 of the filters 58. For example, if liquid has collected in the water tray 54, the liquid can contact bottom portions 114 of the filters 58. The sponge material 60 of the filters 58 may soak up the liquid. The sponge material 60 may also soak up the mist 118 as it contacts the filters 58. The filter holders 84 can define a plurality of holes, or filter openings 90. Each filter opening 90 can be configured for one filter 58 to be positioned within it. The filter holders 84 can be positioned substantially parallel to each other within the filter structure 56. The filter holders 84 can be configured to hold the filters 58 in place. The filters 58 can be positioned substantially parallel to each other and to opposing sides of the filter structure 56. The filter holders 84 can be configured with space, such as air gaps 92, between each filter holder 84 to allow for the mist 118 and/or liquid to contact the filters 58. The air and/or the mist 118 may also flow through the air gaps 92 and out of the evaporative air cooler 10. The filter structure 56 can be formed of plastic, metal, or any other desirable material.

As shown in FIGS. 4-6, the filter structure 56 can include a plurality of filters 58 mounted vertically. The filters 58 can be positioned parallel to the direction of airflow. The filters 58 can be formed from a sponge material 60. The filters 58 can be soaked prior to use. For example, the user can pull the filter drawer tab 120 on the outlet vent 52 to pull out the internal assembly 74, including the drawer 50, water tray 54, and the filter structure 56. The internal assembly 74 can slide out from within the evaporative air cooler 10. The filter structure 56 can be removed from drawer 50. The filter structure 56 can be placed in liquid, such as water, placed under running water, or any other desirable method to soak the filters 58. After the filters 58 are wet, the filter structure 56 can be placed in the freezer, or any other desirable cooling device. If the wet filters 58 are frozen, the cooling effect of the evaporative air cooler 10 can be enhanced. When complete, the user can put the filter structure 56 on the drawer 50 and slide the internal assembly 74 back into the evaporative air cooler 10. If the filters 58 are pre-moistened, the initial cooling effect can increase because air travels through the wet filters 58 when the evaporative air cooler 10 first starts running. If the filters 58 are not presoaked, the evaporative air cooler 10 can produce cool air, but it may not be at capacity.

The filter structure 56, including the plurality of filters 58, can be constructed of sponge material 60, plastic and sponge material 60, or any other desirable material. The filter structure 56, together with the filters 58, can be configured for cleaning. For example, the plastic and sponge material 60 can be cleaned using various methods, such as handwashing, soaking, dishwasher, or any other desirable method. The filter structure 56, including the filters 58, can be sanitized. For example, the filter structure 56, including the filters 58, can be sanitized in a microwave or any other desirable method. The filters 58 can be handled, washed, and used more vigorously than filters formed of paper material.

The filters 58 can be reusable, used longer while wet, re-moistened and re-dried, and have an overall longer lifetime and usability than paper filters. The filter structure 56 can be replaced, for example, after three to six months of use.

The evaporative air cooler 10 can also be powered ON without water in the water tank 40 to dry out the filters 58 and the interior of the evaporative air cooler 10. For example, if a user plans to not use the evaporative air cooler 10 for an extended period of time, the user can empty the water tank 40, press the power button 34 to turn the evaporative air cooler 10 ON to the high mode for a period of time, such as for four hours.

The back face 28 can include the upper portion 68 and the framed portion 64. The back face 28 can include a power port for the power adapter. The power adapter includes a cord with a first power adapter plug on one end that is configured to plug into the power port and a second power adapter plug on the opposite end of the cord that is configured to plug into an outlet, such as a wall outlet or a power strip. The power port can be located in the upper portion 68 of the back face 28 or any other desirable location on the evaporative air cooler 10. In another embodiment, the evaporative air cooler 10 can be powered using batteries or another power source.

The back face 28 can also include a grate 94. The grate 94 can be positioned within the framed portion 64. The grate 94 can include a plurality of ribs positioned horizontally or vertically along the back face 28. As shown in FIGS. 5 and 6, the grate 94 includes both horizontal ribs 96 and vertical ribs 98 that define a plurality of grate openings 100. The plurality of grate openings 100 are configured to allow air to flow from outside the evaporative air cooler 10 to inside the evaporative air cooler 10. The grate 94 may also have a cord guide for securing the cord of the power adapter in place. The cord guide may be located along one side of the grate 94 and adjacent to the framed portion 64, or any other desirable location. The grate 94 may have one or more cord guides tabs. Additionally, some of the horizontal ribs 96 may be shorter to allow for the cord to be positioned flush with the horizontal ribs 96.

Figure 7:
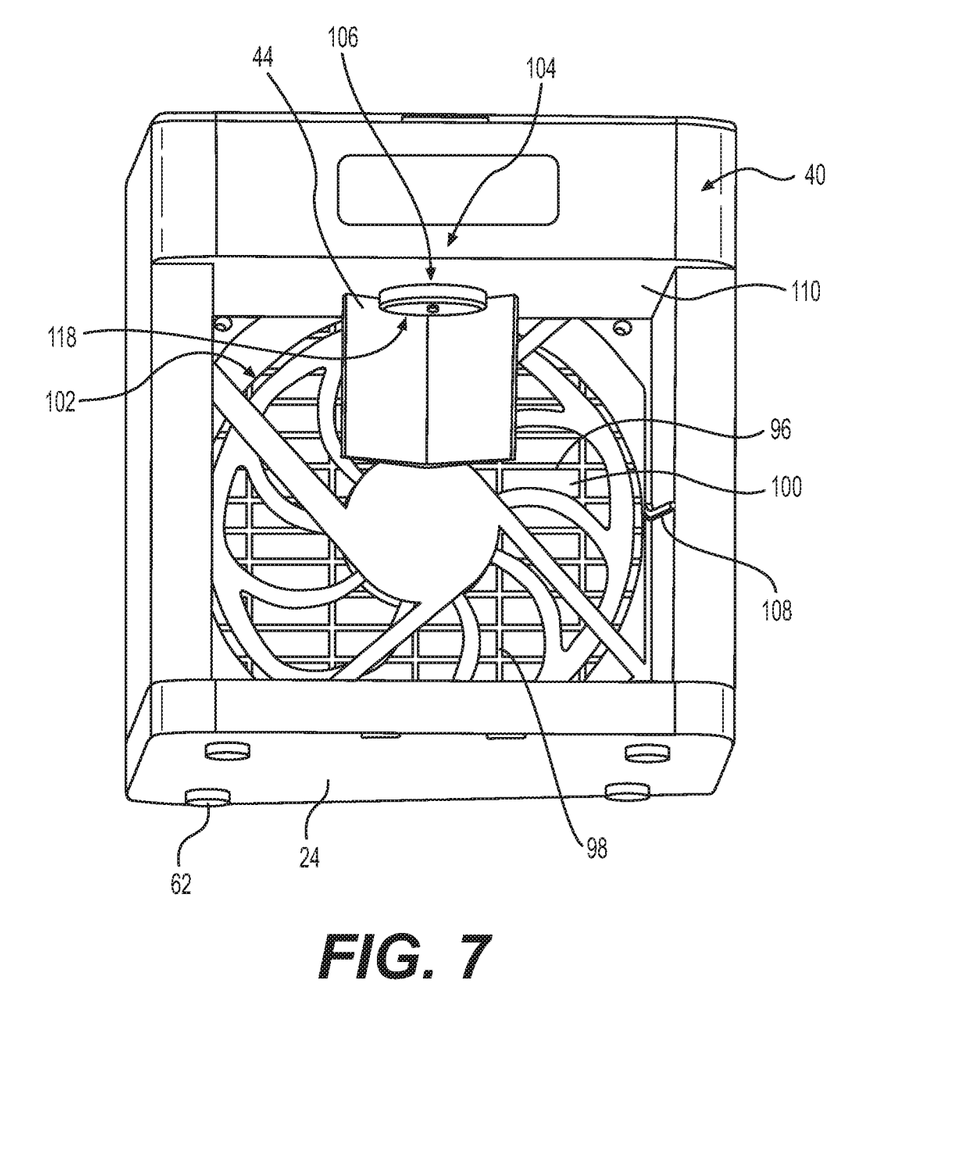
FIG. 7 is a front perspective view of an evaporative personal air cooler after the internal assembly is removed in accordance with aspects of the present disclosure.
Figure 8:
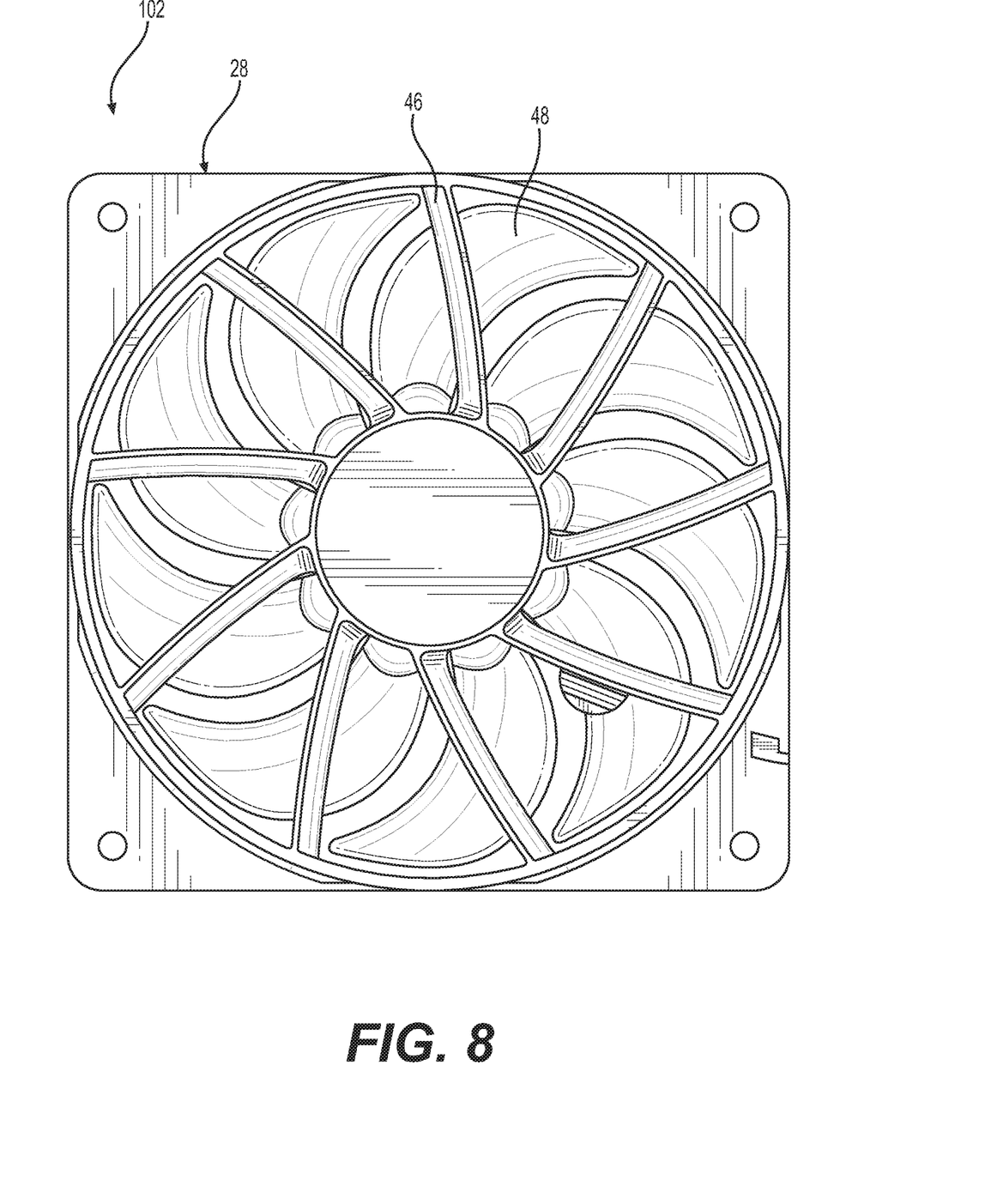
FIG. 8 is a front view of a fan cover assembly of an evaporative personal air cooler in accordance with aspects of the present disclosure.

As illustrated in FIGS. 7 and 8, the fan cover assembly 102 can include the grate 94, the fan 48, and a fan cover 46. The fan cover assembly 102 can be configured to reduce vibration and other movement within the evaporative air cooler 10. By doing so, the fan cover assembly 102 can reduce the noise of operation of the evaporative air cooler 10. The fan cover assembly 102 can also efficiently direct airflow. For example, the fan cover assembly 102 can effectively direct air outward from the evaporative air cooler 10.

For example, the fan 48 can direct airflow from the back face 28 toward the front face 26. The fan 48 can be positioned inside the housing 20 between the grate 94 and the fan cover 46. The fan cover 46 can be configured to further direct the airflow. For example, the fan cover 46 can provide an optimal volume of air flow for the size and type of the evaporative air cooler 10. The fan cover 46 can be configured to maximize the technical and electrical specifications of the fan 48.

The user can control the speed of the fan 48. For example, the user can press the power button 34 to toggle the fan speed between three different speeds (e.g., high, medium, and low speeds). Changing the fan speed can change the water flow rate through the aperture 42. The change in the water flow rate can be proportional to the change in the fan speed. At the high speed, the water flow rate can be at a high rate. At the medium speed, the water flow rate can be at a medium rate. At the low speed, the water flow rate can be at a low rate.

Thus, the misting structure 104 can be configured to produce a variable volume of the mist 118. The volume of the mist 118 produced can be based on the fan speed. For example, as the fan speed increases, the volume of the mist 118 can increase. The increase in the volume of the mist 118 may allow for an optimal amount of moisture to enter into the air, which can result in a better cooling effect. As the fans speed decreases, so may the mist volume.

For example, when the power button 34 is pressed, the evaporative air cooler 10 can turn on. The fan 48 can begin spinning, and the mist 118 can begin to spray from a misting structure 104. The default fan speed can be the high speed when the evaporative air cooler 10 is first powered ON, or any other desirable fan speed. The user can adjust the cooling effect of the evaporative air cooler 10, including the amount of the mist 118 and/or the airflow speed using the power button 34. The user can adjust the airflow direction (e.g., from top to bottom) using the air direction tab 72 on the outlet vent 52. The power button 34 can be pressed again to turn off the evaporative air cooler 10.

As illustrated in FIG. 7, the v-shaped shroud 44 can be positioned on an underside of the top internal panel 110 to allow liquid to transform into the mist 118. The top internal panel 110 can be a wall between the evaporative air cooler 10 and the water tank 40, the bottom of the water tank 40, or any other desirable structure. The v-shaped shroud 44 can be configured to distribute the mist 118 evenly toward the filters 58. An even distribution of liquid on the filters 58 provides an effective cooling effect for the user. The v-shaped shroud 44 can be configured to maximize airflow to the user.

For example, the v-shaped shroud 44 can extend from the bottom of the water tank 40 into the evaporative air cooler 10. The fan 48 used with the v-shaped shroud 44 can turn the liquid into the mist 118 and direct the mist 118 toward the filter structure 56 and filters 58. Some of the mist 118 may evaporate, and some of the mist 118 may travel between the sponge material 60 and through outlet vent 52 to cool the air outside of the housing 20. Some of the mist 118 can soak into the sponge material 60, allowing for later evaporative cooling. Some of the mist 118 can fall into the water tray 54, where it can collect and turn into liquid. The liquid can be absorbed into the filters 58 via capillary action, to allow for additional evaporative cooling. The water tray 54 can be constructed with a slight angle. The slight angle can cause excess or unabsorbed liquid to flow toward the filters 58. The excess liquid can be absorbed by the filters 58 and wicked up, allowing for a longer cooling effect. Also, wicking up the excess water can result in a reduction of water spills if the evaporative air cooler 10 is moved or the drawer 50 is removed from the evaporative air cooler 10.

Figure 9:
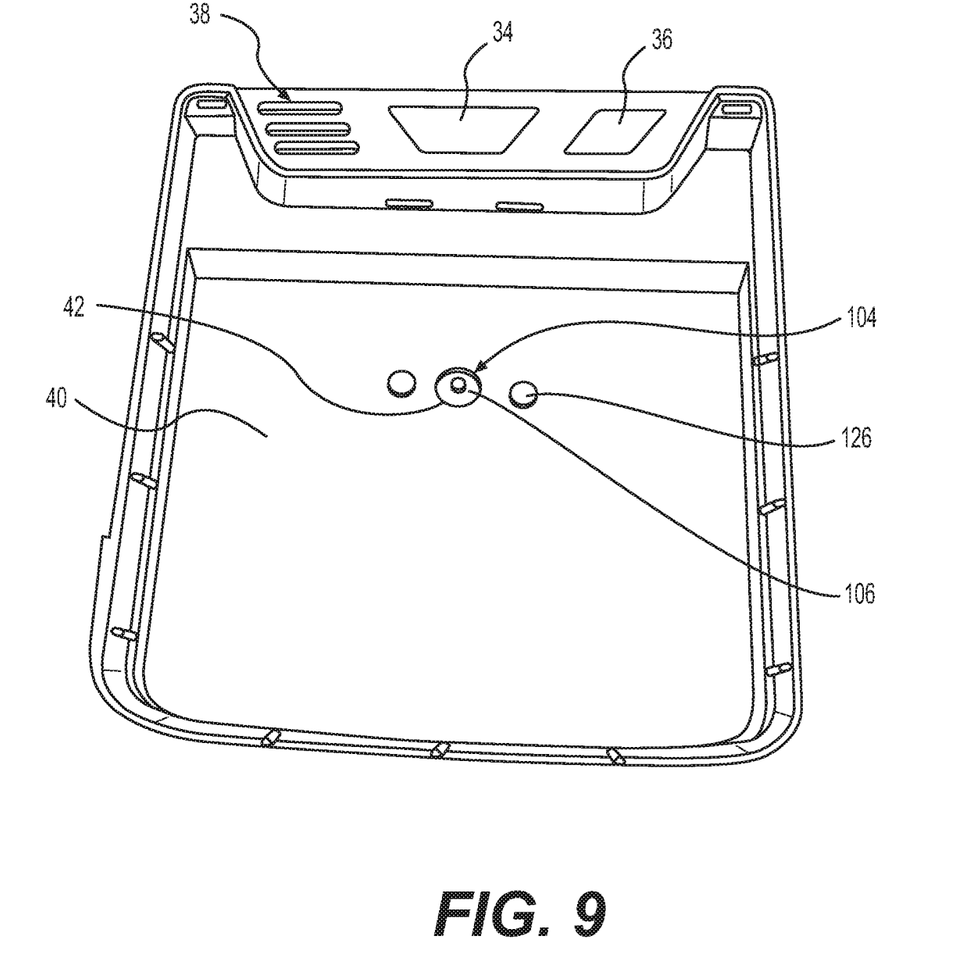
FIG. 9 is a top view of a water tank of an evaporative personal air cooler in accordance with aspects of the present disclosure.

As illustrated in FIGS. 4 and 9, the housing 20 can include a container or a tank, such as the water tank 40 positioned beneath the top face 22. Liquid, such as water, can be placed into the water tank 40. For example, when the hinged lid 32 is open, liquid can be poured into the water tank 40 using a pitcher or any other desirable means. The water tank 40 can have an opening, such as the aperture 42, to release liquid from the water tank 40 into the evaporative air cooler 10. The aperture 42 can be positioned in the bottom of the water tank 40. The aperture 42 can be positioned between the v-shaped shroud 44 and the front face 26. More specifically, the aperture 42 can be positioned between the v-shaped shroud 44 and the filter structure 56.

The evaporative air cooler 10 can use a two-stage cooling for its cooling process. The first stage can incorporate a misting structure 104. The misting structure 104 can include a microporous mister, such as a mister 106. The second stage can incorporate a filter structure 56 having an evaporative sponge filter, such as filters 58 made from sponge material 60. The combination of both stages can produce an instant cooling effect and a prolonged cooling effect.

The mister 106 can provide the instant cooling effect. For example, when the evaporative air cooler 10 is powered ON, the mist 118 begins spraying from a mister 106. The power of the fan 48 can be positioned behind the mist 118 to distribute the mist 118 into the ambient air, or air, and onto the filters 58. As the mister 106 runs for a continued period of time, the filters 58 may become more wet (e.g., damp filters). The air that encounters the mist 118 can feel cooler to the user due to the evaporative cooling process. As air continually travels through the damp filter 58, the cooling effect can be prolonged. When the liquid is depleted from the water tank 40, the mist 118 may cease but the filters 58 can remain wet for a time period, allowing at least some evaporative cooling to continue.

The misting structure 104 can be located or partially located within the water tank 40. For example, the mister 106 can be assembled through the aperture 42 of the water tank 40. The misting structure 104 can be coupled to the bottom of the water tank 40, the top internal panel 110, or any other desirable location using a misting structure coupling 126. The misting structure coupling 126 can include a screw inserted through a screw hole, or any other desirable attachment. The mister 106 can be positioned upside down within the top-filled water tank 40. The mister 106 can release water downward into the interior of the evaporative air cooler 10. Liquid can be fed directly into the mister 106. The mister 106 can distribute moisture to the sponge filter. By misting the filters 58 from an upper portion of the evaporative air cooler 10, the mist 118 can more effectively soak into the filters 58. The mister 106 can create an even distribution of the mist 118 to the filters 58, including to a top portion 112 of the filters 58. Walls of the water tank 40 can have angles configured to allow for an increased volume of liquid to reach the mister 106.

The mister 106 can be configured to restrict water flow from the aperture 42 when the evaporative air cooler 10 is turned OFF.

The misting structure 104 can be wired to the evaporative air cooler 10. The wires can be soldered to electrically connect the misting structure 104 to the evaporative air cooler 10, or attached in any other desirable way. The wires can be hidden in the wire compartment or any other desirable compartment within the evaporative air cooler 10.

The evaporative air cooler 10 can operate for a period of time. The period of time may depend on various factors, such as the amount of water in the water tank 40, whether the filter 58 are presoaked, whether the filters 58 were initially frozen, and a cooling mode selected based on the fan speed. In one embodiment, the evaporative air cooler 10 can operate for eight hours on the high mode, ten hours on the medium mode, and twelve hours on the low mode without refilling the water tank 40.

The evaporative air cooler 10 can include additional and/or fewer components and is not limited to those illustrated in the figures.

In an example embodiment, the evaporative air cooler 10 includes the water tank 40, the misting structure 104, the filter structure 56, and the fan 48. The water tank 40 can include the liquid inlet (e.g., via the hinged lid 32) and the liquid outlet (e.g., via the aperture 42). Liquid can enter the water tank 40 through the liquid inlet and exit the water tank through the liquid outlet. The misting structure 104 can be in liquid communication with the water tank 40. The misting structure 104 can be configured to produce mist 118 as the liquid flows through the liquid outlet. The filter structure 56 can include the plurality of filters 58 positioned substantially parallel to each other and defining air gaps 92 between the plurality of filters 58. The fan 48 can be configured to draw ambient air into the evaporative air cooler 10 and direct the ambient air through the filter structure and out of the evaporative air cooler 10. Thus, the ambient air can be cooled before exiting the evaporative air cooler 10.

The misting structure 104 can distribute the mist 118 into the ambient air and onto the plurality of filters 58. The misting structure 104 can include a mister 106. The mister 106 can be positioned adjacent the water tank 40. The mister 106 can also be positioned within the water tank 40. Liquid can flow through a top portion of the mister 106 from the water tank 40 toward a bottom portion of the mister 106. The mister 106 can project the mist 118 from the misting structure 104 into the ambient air within the evaporative air cooler 10. The mist 118 can cool the ambient air.

The misting structure 104 can produce a first volume of mist 118 when the fan 48 is at a first speed. The misting structure 104 can produce a second volume of mist 118 when the fan is at a second speed. The first volume can be larger than the second volume and the first speed can be faster than the second speed. In other words, when the fan is on high, more mist 118 can spray from the mister 106.

The evaporative air cooler 10 can include an internal assembly 74 configured to form a seal 116 with the fan 48. The seal 116 can cause the ambient air to exit the evaporative air cooler 10 with a greater force than when entering the evaporative air cooler 10. The internal assembly 74 can include at least one of the filter structure 56, and a drawer 50. The internal assembly 74 can be removably attached to the evaporative air cooler 10. The internal assembly 74 can comprises a drawer 50 attached to the outlet vent 52. The drawer 50 can include a water tray 54 angled toward the outlet vent 52. The filter structure 56 can be positioned on the water tray 54 adjacent the outlet vent 52. Any condensation or liquid in the drawer 50 can flow toward the outlet vent 52. The plurality of filters 58 can be formed of sponge-like material, such as sponge material 60. Thus, if the filter structure 56 is positioned adjacent the outlet vent 52, the plurality of filters 58 can soak up the liquid as it flows toward the outlet vent 52. If the plurality of filters 58 are at a liquid capacity, the sponge material 60 may not soak up additional liquid. The liquid in the filters 58 can be used to cool the ambient air. When the liquid in the filters 58 cools the ambient air, the liquid may evaporate from the filters 58. The filters 58 may not be at the liquid capacity after evaporation occurs and thus, can soak up more liquid.

The filter structure 56 can be configured for removal from the evaporative air cooler 10. The filter structure 56 and the plurality of filters 58 can be washable and reusable. The plurality of filters 58 can be presoaked with liquid and inserted into the evaporative air cooler 10. Presoaking the filters 58 can prolong the cooling of the evaporative air cooler 10.

The evaporative air cooler 10 can include a shroud, such as the v-shaped shroud 44, adjacent to the underside of the water tank 40. The shroud can be v-shaped or any other desirable shape.

In an example embodiment, the portable evaporative air cooler 10 for cooling ambient air includes the misting structure 104, the filter structure 56, and the fan 48. The misting structure 104 can be configured to evaporate liquid within the portable evaporative air cooler 10. The filter structure 56 can include the plurality of filters 58 configured to absorb liquid. The fan 48 can be configured to draw the ambient air into the portable evaporative air cooler 10. The ambient air can be cooled by at least one of the mist 118 and the filter structure 56. The fan 48 can direct the ambient air thorough the filter structure 56 and out of the portable evaporative air cooler 10.

The plurality of filters 58 can be formed of a sponge material 60 and positioned to define gaps, such as air gaps 92, between the plurality of filters 58. The plurality of filters 58 can be removable from the portable evaporative air cooler 10. The plurality of filters 58 can be soaked with liquid prior to entering the portable evaporative air cooler 10.

The filter structure 56 can be positioned in a drawer 50. The drawer 50 can be removable from the portable evaporative air cooler 10. The portable evaporative air cooler 10 can include a front grill, such as the outlet vent 52, with the air direction tab 72 for directing air flow and the filter drawer tab 120 for pulling the drawer 50 from the portable evaporative air cooler 10.

In an example embodiment, the personal air cooler 10 comprises the housing 20, the tank, such as the water tank 40, the misting structure 104, the filter structure 56, and the v-shaped shroud 44. The housing includes a top panel (e.g., the top face 22), a bottom panel (e.g., the bottom face 24), and side panels (e.g., the front face 26, the back face 28, and the side faces 30) that can define an interior of the personal air cooler 10. The tank can be positioned adjacent the top panel and at least one of the side panels and configured to receive, store, and release liquid. The misting structure 104 can be in fluid communication with the tank and configured to create the mist 118. The filter structure 56 can be adjacent the bottom panel and at least one of the side panels. The v-shaped shroud 44 can be positioned underneath the tank and configured to direct the mist 118 toward the filter structure 56.

The personal air cooler 10 can include the fan 48 positioned adjacent one of the side panels. The personal air cooler 10 can also include a fan cover 46 adjacent the fan 48 and configured to direct air from outside the personal air cooler 10 toward the v-shaped shroud 44. The v-shaped shroud 44 can direct mist 118 toward a top portion of the filter structure 56 and through the filter structure 56.

The filter structure 56 can include a plurality of filters 58 positioned substantially parallel to each other. Each of the plurality of filters 58 can be spaced apart a specific distance, such as 1 cm, or any other desirable distance. Thus, the plurality of filters 58 can define a plurality of air gaps 92. The plurality of filters 58 can store the mist 118. The air can be cooled by the mist 118. The cooled air can travels through the air gaps 92 and exit the personal air cooler through one of the side panels. The side panel can be the side panel adjacent the filter structure 56 and include the outlet vent 52.

While the disclosure has been described in connection with certain embodiments, it is to be understood that the disclosure is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. An evaporative air cooler for cooling ambient air, comprising:
   a housing with a top panel, a bottom panel, and side panels defining an interior of the evaporative air cooler; and
   a tank positioned adjacent to the top panel and at least one of the side panels, wherein the tank is configured to receive, store, and release liquid;
   a misting structure comprising a mister and a misting structure coupling, wherein the misting structure is configured to create a mist within the evaporative air cooler;
   a filter structure with a plurality of filters, wherein the plurality of filters are configured to absorb the mist; and
   a fan configured to draw the ambient air into the evaporative air cooler, wherein the ambient air is cooled by at least one of the mist and the filter structure, and wherein the fan directs the ambient air thorough the filter structure and out of the evaporative air cooler.

2. The evaporative air cooler of claim 1,
   wherein the plurality of filters are aligned parallel to each other and define air gaps between the plurality of filters; and
   wherein the ambient air is cooled before exiting the evaporative air cooler.

3. The evaporative air cooler of claim 1, wherein the misting structure distributes the mist into the ambient air and onto the plurality of filters.

4. The evaporative air cooler of claim 1, wherein the tank comprises a liquid inlet and a liquid outlet, wherein liquid enters the tank through the liquid inlet and exits the tank through the liquid outlet, wherein the misting structure is in liquid communication with the tank and configured to create a mist as the liquid flows through the liquid outlet, and wherein the
   mister is positioned within the tank wherein the liquid flows from the tank toward the mister.

5. The evaporative air cooler of claim 1, wherein the misting structure creates a first volume of mist when the fan is at a first speed, and wherein the misting structure creates a second volume of mist when the fan is at a second speed.

6. The evaporative air cooler of claim 5, wherein the first volume is larger than the second volume and the first speed is faster than the second speed.

7. The evaporative air cooler of claim 1, further comprising:
   an internal assembly configured to form a seal with the fan, wherein the seal causes the ambient air to exit the evaporative air cooler with a greater force than when entering the evaporative air cooler.

8. The evaporative air cooler of claim 7, wherein the internal assembly comprises the filter structure and a drawer.

9. The evaporative air cooler of claim 1, wherein the filter structure is configured for removal from the evaporative air cooler, and wherein the filter structure and the plurality of filters are washable and reusable.

10. The evaporative air cooler of claim 1, wherein the plurality of filters are formed of sponge-like material.

11. The evaporative air cooler of claim 1, further comprising:
    a shroud adjacent to an underside of the tank, wherein the shroud is v-shaped.

12. The evaporative air cooler of claim 1, wherein the plurality of filters are formed of a sponge material and positioned to define gaps between the plurality of filters.

13. The evaporative air cooler of claim 1, wherein the filter structure is positioned in a drawer, and wherein the drawer is removable from the portable evaporative air cooler.

14. The evaporative air cooler of claim 13, further comprising:
a front grill with a tab for pulling the drawer from the portable evaporative air cooler.

15. The evaporative air cooler of claim 1, wherein the plurality of filters are removable from the portable evaporative air cooler and configured to be soaked with liquid prior to entering the portable evaporative air cooler.

16. An evaporative air cooler for cooling ambient air, comprising:
a housing with a top panel, a bottom panel, and side panels defining an interior of the evaporative personal air cooler;
a tank positioned adjacent to the top panel and at least one of the side panels and configured to receive, store, and release liquid;
a misting structure comprising a mister and a misting structure coupling, wherein the misting structure is in fluid communication with the tank, and wherein the misting structure is configured to create a mist within the evaporative air cooler;
a filter structure with a plurality of filters, wherein the plurality of filters are configured to absorb the mist, and wherein the filter structure is adjacent to the bottom panel and at least one of the side panels;
a fan configured to draw the ambient air into the evaporative air cooler, wherein the ambient air is cooled by at least one of the mist and the filter structure, and wherein the fan directs the ambient air thorough the filter structure and out of the evaporative air cooler; and
a v-shaped shroud positioned underneath the tank and configured to direct the mist toward the filter structure.

17. The evaporative air cooler of claim 16, further comprising:
a fan cover adjacent to the fan and configured to direct air from outside the evaporative air cooler toward the v-shaped shroud, wherein the fan is positioned adjacent to at least one of the side panels.

18. The evaporative air cooler of claim 16, wherein the v-shaped shroud directs the mist toward a top portion of the filter structure and through the filter structure.

19. The evaporative air cooler of claim 16, wherein the filter structure comprises a plurality of filters aligned parallel to each other and defining air gaps;
wherein the plurality of filters stores the mist; and
wherein air is cooled by the mist, travels through the air gaps, and exits the evaporative air cooler through one of the side panels.

20. The evaporative air cooler of claim 16, further comprising:
an internal assembly attached to one of the side panels, wherein the one of the side panels is configured to permit the internal assembly to slide out from within the evaporative cooler;
wherein the internal assembly comprises a drawer attached to the one of the side panels;
wherein the drawer includes a water tray angled toward the one of the side panels; and
wherein the filter structure is positioned on the water tray, and the filter structure is positioned adjacent to the one of the side panels.

* * * * *